Figure 1:
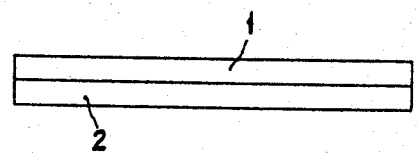

Nov. 1, 1966   J. T. BANNIGAN   3,282,650
ION INDICATING DEVICE
Filed Feb. 11, 1963

INVENTOR.
JOHN T. BANNIGAN
BY
AGENT

3,282,650
ION INDICATING DEVICE
John Thornton Bannigan, Klemzig, Australia, assignor to North American Philips Company, Inc., New York, N.Y., a corporation of Delaware
Filed Feb. 11, 1963, Ser. No. 257,460
2 Claims. (Cl. 23—253)

The present invention relates to an indicator for indicating changes in the type of ions present in the effluent of ion exchange processes and to a method of and apparatus for monitoring such processes.

In particular, the invention relates to an indicator for use in monitoring cation exchange in water such as takes place in domestic and industrial water softening apparatus where ion exchange materials are used to effect a cation exchange whereby sodium is exchanged for calcium or magnesium.

In contrast to processes for the complete demineralisation of water (employing both cation and anion exchange materials) where the effluent can be monitored easily by conductivity tests (the conductivity of the effluent rising immediately after the ion exchange materials become exhausted due to increase of ions in the treated effluent), conductivity tests are not satisfactory in cation exchange processes because the incoming water supply has too great an effect to allow of accurate conductivity or pH determinations being made.

Hitherto monitoring of cation exchange effluents has been carried out by means of the standard soap test using sodium stearate. This test depends on the amount of lathering with sodium stearate produced by the effluent. As the concentration of polyvalent cations increases in the effluent, so does the degree of lathering of the latter with sodium stearate decrease.

An object of the invention is to provide a more sensitive and more easily carried out means of monitoring effluents from cation exchange processes than has hitherto been possible. This object is achieved by providing an indicator which for its operation makes use of the volume change characteristics (i.e. the swelling or shrinking properties) which certain ion exchange materials, such as substantially insoluble synthetic resins or certain zeolites, exhibit according to the nature of the ion they have absorbed.

Accordingly the present invention provides an indicator for indicating the presence of ions in the effluent of ion exchange processes which indicator comprises an ion sensitive device made from resilient strip or sheet material one side of which is dimensionally ion-sensitive and is adapted when contacted with an ionised solution to act as an ion-exchanger and to vary in dimensions according to the nature and the quantity of the ions absorbed thereon so as to cause movement or deformation of the said device, and indicating means adapted to amplify and record such movement or deformation.

The invention further provides the novel ion-sensitive device per se.

Such an indicator based upon the use of an ion-sensitive device as defined above is particularly convenient for use in domestic or industrial water softening apparatus wherein it can be arranged to indicate the presence of hard water immediately the exchange material in the water softening apparatus reaches an exhausted condition.

An ion-sensitive device having the characteristics required by the invention may be manufactured in a number of different ways some of which are mentioned below.

A strip or sheet of active ion-exchange material may be cemented, welded or otherwise fixed in suitable manner to an inert plastic, metal or other material strip or sheet.

The ion exchange material, preferably an ion-exchange resin, may be cast and processed onto a suitable strip or sheet of base material.

A strip or sheet of suitable base material may be so processed on one side as to make one side of the base material ion active.

Ion exchange material in the form of rods, beads or other suitable shapes may be pressed into or otherwise fixed to one side of a suitable base material.

Undoubtedly there are an infinite variety of ways in which the change in dimensions (manifested for example by curvature) of an ion-sensitive device according to the invention when used for the purposes of the invention may be amplified or magnified before being used to operate an indicating needle or similar indicating means but mention will be made only of two particularly convenient ways of doing this. In the first, an ion-sensitive strip is formed into the shape of a spiral, one end of the spiral being attached to a fixed point and the other end being attached to a spindle carrying a pointer so that any change in curvature of the strip rotates the spindle and moves the pointer. In the second the ion-sensitive strip has one end secured to a fixed point while a flexible thread it attached to the other, this thread being passed around a spindle carrying a pointer and having its other end attached to a suitable tension spring.

Preferably the ion-sensitive strip should be immersed in the stream of fluid to be monitored or, if the indicator is suitably constructed, the whole indicator may be so immersed and then inspected by means of a transparent window in the channel for the fluid.

If desired an indicator according to the invention may be used to initiate a regeneration process for the ion exchange materials used in the process being monitored by the said indicator.

In indicators according to the invention it may be desirable to take precautions against some unwanted effects which may interfere with the proper functioning of the said indicators.

It is well known for example that ion exchange resins undergo severe changes in volume during hydration and dehydration and consequently ion-sensitive devices as envisaged by the invention may have to be kept immersed.

When using indicators according to the invention to monitor water softening apparatus, allowance must be made for the fact that some calcium and magnesium ultimately may slip through and accumulate slowly in the ion-sensitive device. The exchange life of the ion-sensitive device should therefore be adjusted to correspond to the life of the material in the softener. This may be done by adjusting the relative velocity of the water through the device and having some means whereby this may be adjusted.

Another way of projecting the ion-sensitive device from an accumulation of calcium would be a small exchange filter in the channel or conduit to the indicator which could be washed and regenerated simultaneously with the main ion-exchange bed of the apparatus.

Many types of ion exchange resins are suitable for use in the indicator of the invention and the methods of preparing such resins are well known. However, by way of illustration an example is set out hereunder showing a method of preparing one such suitable cation exchange resin.

EXAMPLE 1

The first step in the synthesis of a cation exchange resin is the polymerization of styrene to form polystyrene. The styrene molecules are linked together to form long chains, giving the material its solid characteristics. Next, the polystyrene chains are cross-linked with divinylbenzene to form an interlacing network, making the material stable and insoluble. In practice, these two steps are carried out simultaneously.

Finally, the resin is activated by introducing sulphonic acid groups by treatment with conc. sulphuric acid. The hydrogen ion in this group (SO₃H) is interchangeable with any metal ion.

The exchange equation can be represented thus:

$$H^+Resin^- + Na^+Cl^- \rightarrow Na^+Resin^- + H^+Cl^-$$

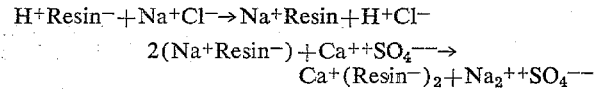

At low concentrations and ordinary temperatures the extent of the exchange increases with increasing atomic number and increasing valency of the exchanging ion. Thus among the common metals found in waters:

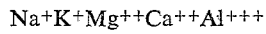

Sodium will be displaced by any of the other metals, which themselves can only be displaced by an ion higher in the series.

At high concentrations, the effect is in favour of the ion in highest concentration and so the sodium can displace calcium and magnesium during regeneration using a strong brine solution.

Although the invention has been described in reference to cation exchange processes, it will be appreciated that the indicator of the invention can be adapted for use in any process where it is required to detect the presence (or absence) of ions in a solution.

Figure 2:
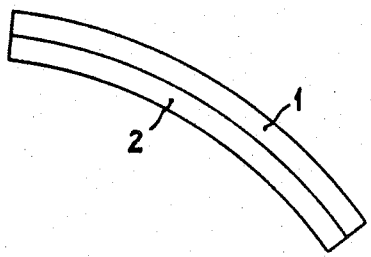

By way of illustration reference will now be made to the accompanying drawing wherein both FIGURES 1 and 2 represent a cross section through an ion sensitive device according to the invention.

A strip of ion exchange resin 1, is attached to a strip of flexible material 2. In FIGURE 1 the device is shown before activation and in FIGURE 2 after activation. The change in shape of the device by curvature can be used to actuate an indicator as hereinabove described.

What is claimed is:

1. An ion sensitive structure comprising a resilient strip one side of which is fixed to a continuous coating of an ion-exchange resin, said ion exchange resin having volume change characteristics dependent on absorption of ions, whereby, when the structure is contacted with an ionized solution, deformation of the device will occur.

2. The ion sensitive structure of claim 1 wherein the resilient strip is spiral shaped.

References Cited by the Examiner
UNITED STATES PATENTS

| | | | |
|---|---|---|---|
| 2,628,191 | 2/1953 | Sard | 210—24 |
| 2,810,692 | 10/1957 | Calmon | 210—25 |

MORRIS O. WOLK, *Primary Examiner.*

Z. PAROCZAY, *Assistant Examiner.*

UNITED STATES PATENT OFFICE
CERTIFICATE OF CORRECTION

Patent No. 3,282,650                                  November 1, 1966

John Thornton Bannigan

It is hereby certified that error appears in the above numbered patent requiring correction and that the said Letters Patent should read as corrected below.

Column 2, line 50, for "projecting" read -- protecting --.

Signed and sealed this 24th day of October 1967.

(SEAL)
Attest:

Edward M. Fletcher, Jr.                                     EDWARD J. BRENNER
Attesting Officer                                            Commissioner of Patents